United States Patent [19]
Malik

[11] Patent Number: 6,081,841
[45] Date of Patent: Jun. 27, 2000

[54] METHOD AND APPARATUS FOR EXPANDING DATA RATE IN AN ISDN COMMUNICATION SYSTEM

[75] Inventor: Naeem Iqbal Malik, Fremont, Calif.

[73] Assignee: Ricoh Company, Ltd., Tokyo, Japan

[21] Appl. No.: 09/021,566

[22] Filed: Feb. 10, 1998

[51] Int. Cl.[7] .......................... G06F 15/16; H04B 7/212; H04B 7/216

[52] U.S. Cl. .......................... 709/227; 370/524; 370/535

[58] Field of Search ................................... 709/227, 249; 370/468, 904, 524, 535

[56] References Cited

U.S. PATENT DOCUMENTS

| | | | |
|---|---|---|---|
| 5,182,751 | 1/1993 | Bales et al. | 370/410 |
| 5,276,679 | 1/1994 | McKay et al. | 370/358 |
| 5,305,318 | 4/1994 | Ozeki et al. | 370/431 |
| 5,345,443 | 9/1994 | D'Ambrogio et al. | 370/437 |
| 5,463,629 | 10/1995 | Ko | 370/463 |
| 5,483,530 | 1/1996 | Davis et al. | 370/465 |
| 5,524,111 | 6/1996 | Le Pennec et al. | 370/465 |
| 5,692,130 | 11/1997 | Shobu et al. | 709/229 |
| 5,757,781 | 5/1998 | Gilman et al. | 370/260 |
| 5,815,505 | 9/1998 | Mills | 370/522 |
| 5,831,969 | 11/1998 | Bales et al. | 370/225 |
| 5,832,240 | 11/1998 | Larsen et al. | 710/240 |
| 5,856,999 | 6/1999 | Robinson et al. | 375/221 |
| 5,938,735 | 8/1999 | Malik | 709/238 |
| 5,954,799 | 9/1999 | Goheen et al. | 709/250 |
| 5,959,998 | 4/1994 | Takahashi et al. | 370/431 |

OTHER PUBLICATIONS

Recommendation V.120, "Support of an ISDN of Data Terminal Equipment with V–Series Type Interfaces with Provision for Statistical Multiplexing," ITU, pp. 1–24, Oct. 1996.

Duncanson, J., "Inverse Multiplexing," IEEE Communications, pp. 34–41, Apr. 1994.

Fredette, P., "The Past, Present, and Future of Inverse Multiplexing," IEEE Communications, pp. 42–47, Apr. 1994.

Kovarik, K., et al., "Multi–Rate ISDN," IEEE Communications, pp. 48–54, Apr. 1994.

ITU–R Recommendation H.244, "Synchronized Aggregation of Multiple 64 or 56 kbit/s Channels," ITU, entire document, Jul. 1995.

*Primary Examiner*—Zarni Maung
*Assistant Examiner*—Andrew Caldwell
*Attorney, Agent, or Firm*—Oblon, Spivak, McClelland, Maier & Neustadt, P.C.

[57] ABSTRACT

A method and apparatus in an ISDN system form a setup message at a source terminal where the setup message includes a request for two B channels. The source terminal, relays the setup message with the request to a switch, where the switch, invokes a channel coordination mechanism, that recognizes the linkage of the two B channels for communication between the source terminal, and a destination terminal. The switch then determines whether both B channels are available to the destination terminal, and enables the high capacity 128 kbps connection between the source terminal and the destination terminal if in fact the two B channels are available for both the source terminal and the destination terminal.

18 Claims, 12 Drawing Sheets

| FL | B1 | LDL | FaL | B2 | LDL | B1 | LDL | B2 | LDL |

200

(Background Art)

Fig. 2

| | | | | | | |
|---|---|---|---|---|---|---|
| Data Rate Expansion Flag (Indicator) ⟋580 | Communication Type ⟋582 | Indicator: Total Channels ⟋584 | Station Telephone Numbers ⟋586 | Channels Connected ⟋587 | Expansion ⟋588 | Stop Flag ⟋590 |

Fig. 9

METHOD AND APPARATUS FOR EXPANDING DATA RATE IN AN ISDN COMMUNICATION SYSTEM

CROSS-REFERENCE TO RELATED APPLICATIONS

This application contains subject matter related to that disclosed in commonly owned, co-pending application Ser. No. 08/841,655 filed on Apr. 30, 1997 entitled "A Method And Apparatus For Routing Data Information Conveyed In A Facsimile Message" and U.S. Pat. No. 5,938,735 filed on Oct. 21, 1997 entitled "Method And Apparatus For Establishing Optimized ISDN Communication Conditions", the contents of which are incorporated herein by reference.

BACKGROUND OF THE INVENTION

1. Field of the Invention

The present invention pertains to communication systems and methods for communicating information over an Integrated Services Digital Network (ISDN) network. In particular, the present invention pertains to establishing over an ISDN D channel a communication link between a source terminal and a destination terminal via a modified ISDN switch that handles two ISDN B channels as a single composite B channel without requiring the source and destination terminals performing bonding or multilink protocol processes.

2. Discussion of the Background

Conventional facsimile devices communicate over the Public Switch Telephone Network (PSTN) using analog signals that are transmitted over conventional telephone lines. The source terminal (e.g., a facsimile device, computer with scanner and modem facilities, or another device that transmits and/or receives data) converts digital scanned information into a corresponding analog signal so the same may be sent over the PSTN telephone line, via a telephone switch facility, to the destination terminal. The source terminal receives the analog information and converts the analog information back into digital signals which form the basis of an image to be printed, perhaps on facsimile paper.

The Integrated Services Digital Network (ISDN) is emerging as a next generation worldwide public telecommunications network that will replace existing public switch telephone networks and provide a variety of services that are not offered by the PSTN. ISDN will allow the transmission of various types of data between various types of ISDN terminal equipment (TE).

A portion of the ISDN link between a source terminal and a central office, which has a switch facility, is referred to as a "digital pipe". A capacity of the pipe is generally discussed in terms of separate channels. In particular, a "basic access" digital pipe includes two B channels (basic channels) that each support 64 kbps signaling, and a D channel at 16 kbps. While the total bit rate of these three channels is 144 kbps, framing, synchronization and other overhead bits bring the total bit rate of a basic access link to 192 kbps. Furthermore, the B channels serve as separate communication channels such that the maximum data capacity, as view by the user, is 64 kbps per B channel, and 16 kbps for the D channel, not 192 kbps.

Conventional facsimile devices at most send signals at rates not exceeding 64 kbps, because only one of the two B channels are used. Because facsimile data is arranged in a predetermined format, sending data over two separate B channels would be a sizable task because conventional ISDN switches handle the B channels separately, and thus may send data of one of the B channels over a completely different route than that of the other B channel. As a consequence, the different communication paths impose different communication delays on the respective B channels.

Other devices such as video teleconference facilities, assume the processing burden of "bonding", or employing multilink point-to-point (multilink PPP) protocols so as to increase the data rate approaching a 128 kbps digital connection. The bonding approach imposes on the customer premise equipment (CPE) the function of dialing to the ISDN switch and establishing the subsequent calls needed to achieve the desired data rate. Thus, two separate links are established. In particular, by assuming the burden of maintaining two separate communication connections with the ISDN switch, the CPE can give the appearance to a user that a 128 kbps channel is available to the user. However, the bonding approach is cumbersome in that the ISDN switch assumes each of the B channels may be handled independently, and therefore impart different delays into the separate B channels. As a consequence, the CPE must compensate for the delays between the respective B channels, and piece together the received and transmitted information so as to avoid synchronization problems.

Multilink PPP schemes attack the problem from a different approach, although also placing a similar processing and data management burden on the CPE. The multilink PPP attempts to make the ISDN switch oblivious that two B channels are effectively being combined to provide an effective data rate approaching 128 kbps. The multilink protocol involves dividing the user's source data into specific fragments, including overhead information in the respective packets, so that the packets may be sent over all available channels, and later recombined in a contiguous fashion. As with bonding, multilink PPP places a computational and management burden on the CPE, rather than at the ISDN switch.

Conventionally, the function served by the ISDN D channel, is twofold. First, the D channel is used to establish and maintain signaling between the CPE and the ISDN switch (operated by the telephone company). Thus, the D channel carries signaling information such as that required for dialing the telephone number of the destination terminal and making the connection between the source terminal and the destination terminal. A more complete description of the D channel as employed in narrowband and broadband ISDN, as well as ISDN terminal equipment, protocols, data rates, etc. is provided in the literature, for example in Stallings, W., "Data and Computer Communications", 5$^{th}$ Edition, Prentice Hall, 1997, pp 740–769 (hereinafter "Stallings") the contents of this book being incorporated herein by reference.

FIG. 1 is a block diagram of a conventional ISDN system having a source facsimile 10 at a source facility 1 that communicates via an ISDN switch 22 to a destination facsimile 16 (or other type of destination terminal, such as a computer, ISDN equipped photocopier, etc.) in a destination facility 2. The source facsimile 10 communicates via a terminal adapter 10A, shown as an internal device, although a separate external terminal adapter may be used as well. The terminal adapter 10A provides a protocol (physical layer and intermediate layer) conversion function for converting signal protocols such as V.35, RS-232, Universal Serial Bus (USB), IEEE 1394 (FireWire), etc. to an ISDN compliant protocol over a 4-wire interface. In the source facility 1, the bonding or multilink PPP mechanism may be incorporated in the source terminal 10, adapter 10A or in the NT1 14.

The NT1 14 connects the source facilities 1, via a two-wire line 15, to a switching module 26 located at the ISDN switch 22. Alternatively, a second network termination (NT2) may be used at the source facility 1 between NT1 and the terminal adapter to provide a switching and concentration function, such as with a digital private branch exchange (PBX). Likewise, the NT1 may be replaced with a NT12 that performs the functions of both the NT1 and NT2.

At the ISDN switch 22, the switching module 26 connects to a processor 24 and another switch module 28 via a bus 27, which allows digital commands and data to be passed between the respective switching modules 26 and 28, and the processor 24.

The equipment at the destination facility 2 may or may not be exactly similar to that of the source facilities 1. In the system shown at FIG. 1, the destination facility 2 includes the destination facsimile 16 having a terminal adapter 16A incorporated therein, which connects to another NT1 20 as shown. The NT1 20 connects to the switching module 28 in the ISDN switch 22, via another two-wire line 17 as shown.

ISDN communications is based on a seven layer protocol stack, as explained in reference to FIG. A.5 of *Stallings*, for example. Control signaling is accomplished between the respective user-network interface and occurs at a third layer of the protocol stack (i.e., the "network" layer) and is named I.451/Q.931. Thus, establishing and maintaining control signaling for a communication link established between the source facility 1 and a destination ISDN facility 2 through the D channel, and in particular, the ISDN network layer, data link layer and physical layer.

FIG. 2 is a frame structure 200 of a transmission from source facilities 1 to the ISDN switch 22, for an ISDN basic rate access. The frame structure 200 includes 48 bits which are transmitted in 250 μsec. Components of the frame structure 200 include framing bits, F, dc balancing bits, L, B channel bits for the first B channel (16 per frame), B1, B channel bits for the second B channel (16 bits per frame), B2, D channel bits (4 per frame), D, auxiliary framing bit, Fa. A more detailed description of the frame structure, as well as a corresponding frame structure for the frames sent from the ISDN switch 22 to the source facilities 1, is described in *Stallings*, pp 212–215.

A link access protocol (LAPD) D channel is defined for establishing particular LAPD frames that are exchanged between the subscriber equipment (either at the source facility 1 or at the destination facility 2) and the ISDN switch 22. The call control protocol I.451/Q.931 is used on the D channel to establish, maintain and terminate connections on B channels.

FIG. 3 illustrates the signaling sequence between the source facility 1 and the ISDN switch 22. In order to establish each B channel connection between the source facility 1 and the destination facility 2, an initial communication link must be established on the D channel between the source facility 1 and the destination facility 2. To this end, a series of messages is sent back and forth between the source facilities 1 and the ISDN switch 22. This communication between the source facilities 1 and ISDN switch 22 occurs on a continuing basis on the D channel, while communications are maintained between the source facilities 1 and destination facilities 2 on the B channel. As shown in FIG. 3, several different messages are sent between the source facilities 1 and ISDN switch 22 while the D channel is maintained. A similar, redundant procedure is performed when the second B channel is established for bonding or multilink PPP purposes.

The direction of the arrows in FIG. 3 indicates a direction of communication between the source facilities 1 and the ISDN switch 22. The process for establishing a connection is initiated by the source facilities 1 by first sending a setup message. Particular features of the setup message will be discussed with respect to FIG. 3, however the purpose of the setup message is to provide general information regarding the request to connect to the ISDN switch 22. Next, the ISDN switch 22 responds with a call proceeding message that indicates that call establishment has been initiated. Subsequently, the ISDN switch 22, sends a connect message that indicates call acceptance by the source facilities 1. The source facilities 1 then sends a connect acknowledge signal that indicates the user has been awarded the call. When the user wishes to disconnect a call, the user sends a disconnect message via the source facilities 1 to the ISDN switch 22, requesting connection clearing. In response, a release message is sent from the ISDN switch 22, indicating the intent to release the channel and call reference. In response the source facilities 1 issues a release complete message, indicating that the release of the channel and the call reference. Subsequently, the call and information flow through the B channel is terminated.

FIG. 4 show the structure of a conventional ISDN D channel setup message. The setup message includes respective LAPD frames (e.g., 501, 503 . . . ) of different sizes (measured in octets). The message includes a flag frame 501 that is one octet in length, followed by a service access point identifier (SAPI) frame 503 having a command/response bit (CR) and address field extension bit (0). The SAPI frame 503 is joined with the terminal end point identifier (TEI) frame 505, each of which are one octet in length. A control frame 507, is one or two octets in length, and is followed by an information frame 509, which has a variable length between 0 and 128 octets. A frame check sequence frame 511 follows and occupies two octets in length. An end frame 513 serves as an end of setup message flag.

The SAPI frame 503 includes a first subfield "SAPI", that identifies a protocol layer-3 user, as well as subframes C/R and 0, that are used as a predetermined formatting feature of SAPI. The terminal end point identifier frame 505, is used to provide a unique terminal end point identifier that is used to identify the user's equipment. The control frame 507 defines the type of frame format that will be employed such as an information frame, supervisory frame, and unnumbered frame for example. The information frame 509, includes a variable number of octets varying from 0 to 128 and contains respective subfields that contain any sequence of bits that form an integral number of octets.

Thus, when a user wishes to send data to a destination, information in the information field is passed directly to the destination user without the ISDN switch deciphering the contents of the information. Following the information field 509, the frame check sequence 511 is included and forms an error-detection function by calculating a code from the remaining bits of the frame, exclusive of the flags. The normal code is a cyclical redundancy check code. Finally, the end flag frame 513, includes a specific code indicating the end of the setup message.

As identified by the present inventor, a limitation with the conventional ISDN setup architecture is that there is no suitable approach for arranging a single 128 kbps connection between a source terminal and a destination terminal, by way of the ISDN switch. Because the ISDN switch handles the different B channels independently, the ISDN switch imparts a significant degree of uncertainty regarding the communications paths assigned to different B channels that both have common origins and destinations—the net result being different, and perhaps non-static, interchannel delay. Conventional bonding and multilink PPP based systems overcome the delay obstacle imposed by the ISDN switch by employing more expensive and complex source and destination equipment so as to accommodate the processing and management overhead for "combining" two B channels. Furthermore, many conventional ISDN terminals such as G4 facsimile machines, are not configured to communicate over a 128 kbps link, as it is presumed that no more than 64 kbps is available for facsimile transmissions.

SUMMARY OF THE INVENTION

Accordingly one object of the present invention is to provide a novel method, apparatus and system that provides expanded data rates in ISDN networks that overcomes the above limitations of existing methods, apparatuses and systems.

It is a further object of the present invention to provide a source ISDN terminal configured to transmit a request message to an ISDN switch, indicating that the source terminal requests that the ISDN switch handle two B channels as a composite channel for transmission of up to 128 kbps.

It is yet another object of the present invention to provide a method and ISDN switch that establishes the composite channel between the source terminal and a destination terminal.

It is yet another object of the present invention to provide a method and ISDN switch configured to coordinate with the destination terminal to determine if the destination terminal can accommodate the composite channel, as requested by the source terminal.

It is another object of the present invention to provide a method and ISDN switch that supports composite channel communications yet changes to a single B channel connection when requested by either the source terminal or the destination terminal.

These and other objects are achieved with the inventive method, apparatus and system, that forms a setup message at a source ISDN terminal where the setup message includes a request for two ISDN B channels as a composite channel. The ISDN source terminal, relays the setup message with the request to the ISDN switch, where the ISDN switch invokes a channel coordination mechanism that links two B channels for communication between the source terminal, and a destination terminal. The ISDN switch then determines whether both B channels are available to the ISDN destination terminal so as to enable an expanded data rate of 128 kbps between the source terminal and the destination terminal, if the two B channels are available for both the source terminal and the destination terminal.

A facet of the present invention is the use of a modified ISDN switch, modified to handle two B channels as a single channel. The modified ISDN switch includes a processor-based channel coordination mechanism configured to determine if a source terminal requests a composite channel, and handle both B channels as a single composite channel, if the destination terminal has available, and agrees to allocate, two B channels for the expanded data rate communication.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a conventional frame structure for communicating between a source terminal and an ISDN switch in ISDN basic rate access;

FIG. 9 is a block diagram of a data rate expansion message as shown in FIG. 8;

DESCRIPTION OF THE PREFERRED EMBODIMENTS

Figure 5:
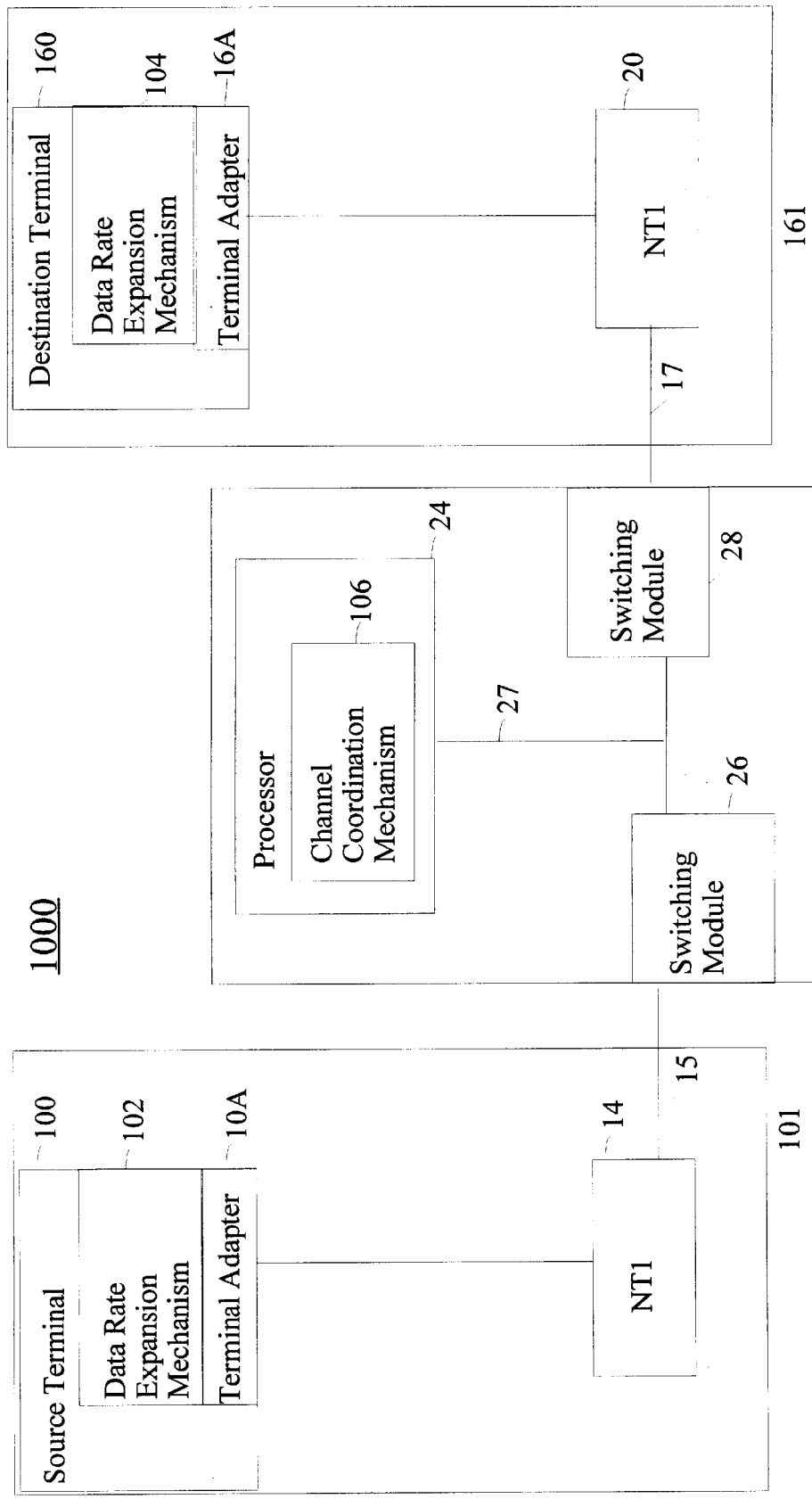
FIG. 5 is a block diagram of an ISDN system including data rate expansion mechanisms and a resource coordination mechanism according to the present invention.

Referring now to the drawings, wherein like reference numerals designate identical or corresponding parts throughout the several views, and more particularly to FIG. 5 thereof, there is illustrated an Integrated Digital Service Network (ISDN) system 1000 in which a source terminal 100 communicates with the destination terminal 160 via a modified ISDN switch 220 (referred to hereinafter as ISDN switch 220). The source terminal 100 is included as part of a source facilities 101, located at a user site and is part of the CPE. The source terminal 100 includes a data rate expansion mechanism 102 (as will be discussed), a terminal adapter 10A and network termination 1 (NT1) 14, alternatively only a single NT1 is used at the source facilities 101 and the destination facilities 161. Connected to the NT1 14, is a two wire ISDN line 15 that connects the source facilities 101 to the ISDN switch 220.

The ISDN switch 220 includes a processor 24 (e.g., one or more discrete central processing units), with associated memory (e.g., RAM, ROM, and/or mass storage), interface devices, etc, switching modules 26, 28 and bus 27. An example of a suitable processor 24 with switching modules 26, 28 is the 5ESS SWITCH available from AT&T, although appropriately modified to include the channel coordination mechanism 106 as will be discussed herein. The second switching module 28 is connected via the bus 27 to the first switching module 26 and the processor 24. The second switching module 28 also connects to another two wire ISDN line 17, which in turn is connected to a NT1 20 of the destination facilities 161.

The NT1 20 of the destination facilities is connected to a destination terminal 160 having a data rate expansion mechanism 104, and a terminal adapter 16A. The terminal adapter is shown to be an internal component of the destination terminal 160, although an external terminal adapter, as well as an external data rate expansion mechanism 104 may also be used.

An example of the source terminal 100 or destination terminal 160 is a Ricoh FAX-4700L, which includes a G4 option, and Ricoh RS232PC-FAX expander, for example, appropriately modified to include a data rate expansion mechanism, preferably accomplished as a computer based product and as will be discussed in reference to FIGS. 6 and 7A. The source terminal 100 is configured to send information to the destination terminal in various forms, such as facsimile images through the G4 facsimile convention, audio, video, or other digital signals that are compatible with ISDN. Depending on the perceived desired communication speed (i.e., data transfer rate which corresponds to time required to transmit a facsimile image, or other data file) the source terminal 100 may request the ISDN switch 220 allocate a composite B channel (two B channels handled as one). The request is made by the source terminal 100 preparing and sending to the ISDN switch a data rate expansion message.

The system 1000 begins operation by receiving at the source terminal 100 an indication from a user that the user wishes to send information to the destination terminal 160 at an expanded data rate, using the combined channel capacity of 2 B channels. Optionally, the source terminal 100 itself will not query the user, but communicate directly with the channel coordination mechanism 106 in the ISDN switch 220, automatically requesting the expanded data rate service if the destination terminal 160 has 2 B channels available. In the present embodiment, however, the user indicates the user wishes to use the expanded data rate by responding to a prompt on a display of the source terminal (as will be discussed with respect to FIG. 7). In response, the data rate expansion mechanism 102, forms a setup message in memory that includes a data rate expansion message. The source terminal 100, after forming the setup message, sends the setup message through the terminal adaptor 10A, NT1 14 and to the ISDN switch 220 via the line 15.

In response to receiving the setup message at the switch module 26, the ISDN switch 220 passes the message to the processor 24, where the data rate expansion message included in the setup message is extracted and analyzed by the channel coordination mechanism 106. The channel coordination mechanism 106 stores an indication of the request in RAM, and initiates an initial investigation as to whether the destination terminal 160 has available to it at least two available B channels (only two B channels are available if the destination terminal 160 has a basic service, but will have additional B channels if the destination terminal 160 has a primary service subscription). The investigation performed by the channel coordination mechanism 106 is performed by initiating a communication query to the destination terminal 160, via the switching module 28, ISDN line 17, NT1 20, and terminal adaptor 16A. Once the destination terminal 160 receives the channel query message, the destination terminal 160 responds to the inquiry in a reply message to the processor 24. Alternatively, the channel coordination mechanism 160 and the ISDN switch 220 may monitor the communication with the destination terminal 160, so as to determine whether the destination terminal 160 has available to it at least two B channels.

The processor 24, now knowing that two B channels are available at the destination terminal 160, informs the source terminal 100 that a composite B channel (with combined capacity of 128 kbps) is available for the source terminal 100 to communicate directly with the destination terminal 160. The processor 24 in the ISDN switch, enables the switching modules 26 and 28, to consider the relaying of the second B channel in the ISDN frame, to be controlled by the information provided by the first B channel portion of the ISDN frame. Effectively, the switching module 26 and 28, ignore the overhead associated with the second B channel data in the ISDN frame and handle both B channels as a single B channel. As a consequence, the ISDN switch 220 will not send the two B channels over two different communications paths. Although not shown in FIG. 5, the ISDN switch 220 may send signals from the source terminal 100 to other switching stations and other communications links, rather than a direct connection to the destination terminal 160. Thus, if the composite B channel is assigned by the ISDN switch 220, both B channels will be sent together over the same communications route to the destination terminal 160—thereby assuring that the propagation delay is the same for each B channel.

The above-described coordination process is performed completely over the D channel, without requiring the B channels for the initial setup of the system 1000. By modifying a conventional source terminal 100, to include the data rate expansion mechanism 102, and modifying the switch 220 to include the channel coordination mechanism 106, the present system avoids the hardware and software complexity of conventional systems that use bonding or multilink PPP to provide expanded data rate services. This is accomplished by shifting the hardware and software complexity to the ISDN switch 220 which essentially ignores routing information associated with the second B channel, when so requested by the source terminal 100 in a data rate expansion request message.

Optionally, when a composite B channel (128 kbps) is established and is being used, either the source terminal 100 or the destination terminal 160, may request the channel coordination mechanism 106 to dynamically change the composite B channel (128 kbps) to a conventional single B channel (64 kbps), by informing the channel coordination mechanism 106 that the reduced data rate is desired, and waiting for the channel coordination mechanism 106, to acknowledge that the changeover has in fact taken place. In this case, the sending terminal, which in this case is the source terminal 100, will include a specific code send on the D channel, indicative of the last B2 channel packet to be send over the expanded data rate service. Thus, the destination terminal 160 will know when the changeover is made between the expanded data rate service to the single B channel service. The source or destination terminal, 100, 160 respectively, may request this reduction in data rate, because the source terminal 100 or destination terminal 160 may have a need to use the second B channel for another purpose, say to communicate with a third terminal (not shown). Again, this request to change from the expanded data rate channel to a single B channel, may be made over the D channel in a data rate expansion message, or alternatively in a resource coordination message as is explained in co-pending application Ser. No. 08/955,353 entitled "Method And Apparatus For Establishing Optimized ISDN Communications Conditions". This feature of dynamically changing the channel access, once again is dependent on the ISDN switch 220 using the channel coordination mechanism 106 to respond to source or destination terminal requests for adaptively changing allocated channels. In contrast to conventional systems, the present system places the burden at the ISDN switch 220, and not at the source terminal 100 or destination terminal 160 for implementing the majority of the features required to perform the dynamic allocation.

Figure 6:
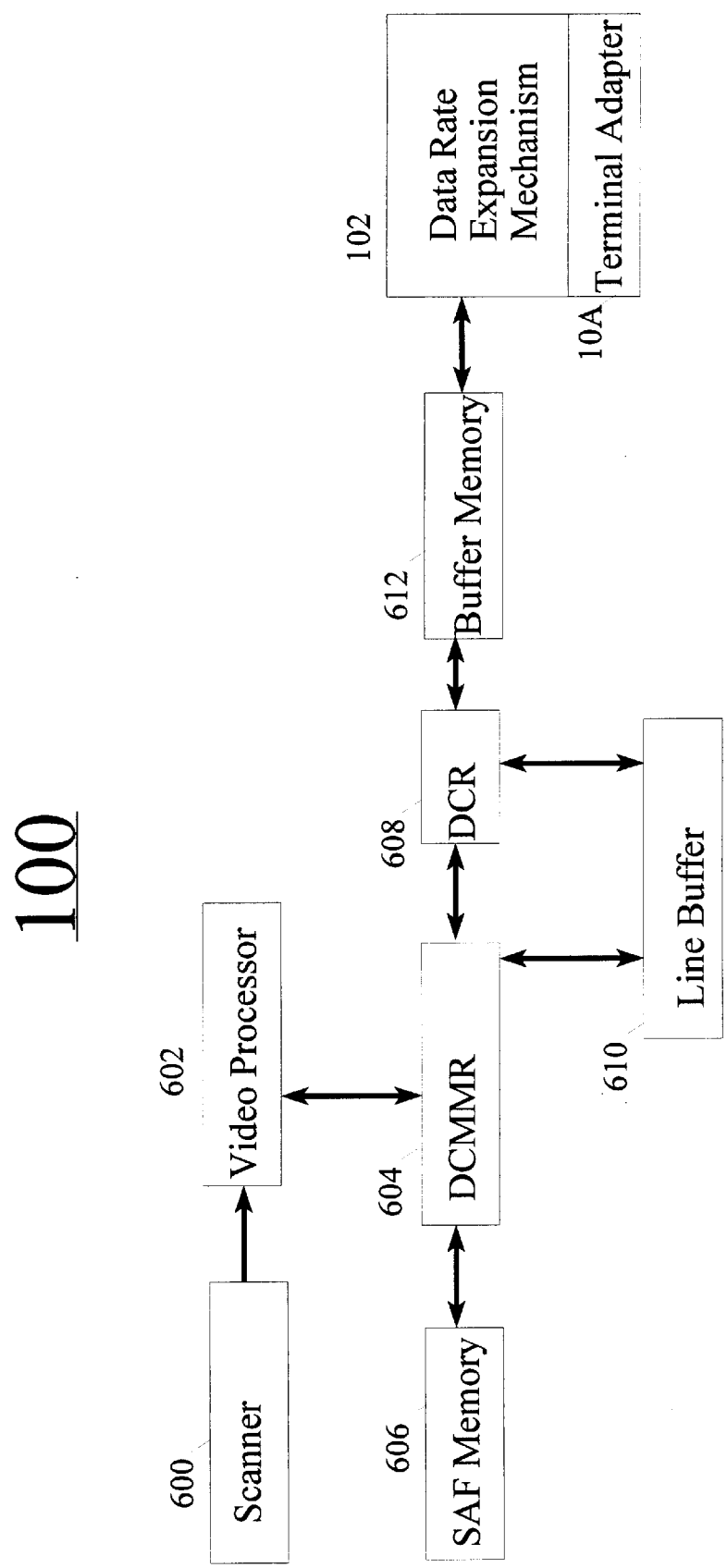
FIG. 6 is a block diagram of the signal processing mechanisms and selected components in a source, or destination, terminal according to the present invention.

FIG. 6 illustrates a block diagram of major features of the source terminal 100. As the preferred embodiment is directed to a facsimile machine, a scanner 600 is included, which scans an original document and produces a digital output provided to a video processor 602. The scanning process is initiated by an operator inputting an ISDN number and pressing a start button on a keypad (as will be discussed with respect to FIG. 8) to initiate the dialing, procedure and initiate the scanning process at the same time. The video processor 602 receives the data and frames the data for possible manipulation by the operator if so desired. Otherwise, the frame data is then passed to a data compression modified modified read (DCMMR) mechanism 604, implemented in software executed by a processor (not shown). The DCMMR reduces redundancy in the video information so as to provide for more efficient use of the communications channel. Alternatively, previously scanned data, or other data, stored in a store and forward (SAF) memory 606 is input to the DCMMR 604 for transmission to the destination terminal 160. In a receive mode of operation, the data compression ratio register (DCR) 608, uses a line buffer 610 as needed to receive the compressed data for ultimate decompression by the DCMMR 604. Again on the received side, the DCMMR, after decompressing the received video data, passes the video data to the video processor 602, which formats the decompressed video data into output data for display on a display device or for printing on a printer. When printed to a printer the output signals are sent to a laser power controller (LPC) that controls a laser diode driver (LDDR), not shown.

The buffer memory 612 holds the compressed video information for use by the data rate expansion mechanism 102. The data rate expansion mechanism 102 includes a processor (such as a central processing unit or a digital signal processor) so as to implement a serial communication controller (SCC) for handling both B1 and B2 channels. More particularly, in addition to handling the data rate expansion coordination with the ISDN switch 220, the data rate expansion mechanism 102 also formats the data into an ISDN frame for transmission to the ISDN switch. To this end, the data rate expansion mechanism 102, will format 32 bits of contiguous data into one ISDN frame (see e.g. FIG. 2) such that 32 bits of B1 and B2 data are set in one frame at a rate of 128 kbps. The serial communication control implemented in the data rate expansion mechanism 102, will sequentially fill 32 bits of data in respective of the ISDN frames, and send the frames, until all the data has been transmitted.

Because the ISDN switch 220 recognizes that the source terminal 100 is communicating with the destination terminal 120 over a composite B channel (128 kbps) the ISDN switch 220 handles the data contained in the B2 portion of the ISDN frame as being data no different than data contained in the B1 portion of the frame. To this end, the ISDN switch 220 sends the entire ISDN frame to the destination terminal 160, where the destination terminal 160 performs an inverse process to that performed at the source terminal 100, so as to receive the video information. More particularly, at the destination terminal 160, a data rate expansion mechanism 104 extracts the B1 and B2 information from the respective frames, concatenates the respective data, and provides the concatenated data to the buffer memory, for decompression by the DCMMR, with the assistance of line buffer and SAF memory, for storage on an as-needed basis. Ultimately, as previously discussed, the decompressed video data will be displayed and/or printed.

Alternatively, the serial communication controller implemented in the data rate expansion mechanism 102, may implement two separate serial communication controllers, one dedicated for filling the respective B1 channel portions of the respective ISDN frames, and the other filling the B2 portions of the respective ISDN frames. The destination terminal 160, will then employ a reverse process, where the data rate expansion mechanism 104 will employ a first and second serial communication controller to extract the respective 8 bit portions associated with the B1 and B2 channels for each of the respective ISDN frames. The data will then be buffered, decompressed, processed as necessary with a video processor and printed or displayed. The data rate expansion mechanism 102 includes a CPU, RAM ROM and optionally an application specific integrated circuit, all of which are available in the source terminal 100. The mechanism itself is primarily performed in software, although hardware equivalents such as that which may be performed with an application specific integrated circuit or a programmable logical device is also applicable.

The terminal adapter 10A, is a conventional device that converts between various types of signal formats. For example, the terminal adapter 10A receives a RS-232 output or a V.35 output from the source terminal 100 and converts the same into a four wire interface so as to be compatible with the conventional NT1 14.

A brief description of the data rate expansion mechanism 102 is presently discussed, but an additional explanation will be made in reference to FIG. 8. The source facilities 101, complies with the D-channel call-control protocol I.451/Q.931 to set up the B channel connection with the destination terminal 160. In order to establish a "composite" B channel connection (i.e., a single 128 kbps channel, as viewed by the source and destination facilities 101, 160 and ISDN switch 220), the source facilities 101 initiates a data rate expansion coordination procedure with the ISDN switch 220, which in turn performs a similar resource coordination procedure with the destination facilities 161. The destination facilities 161 includes the NT1 20, as well as a terminal adapter 16A and destination terminal 160 as shown. The data rate expansion mechanism 104 at the destination terminal 160 is implemented in a similar manner to the data rate expansion mechanism 102 at the source facilities 101.

Figure 7A:
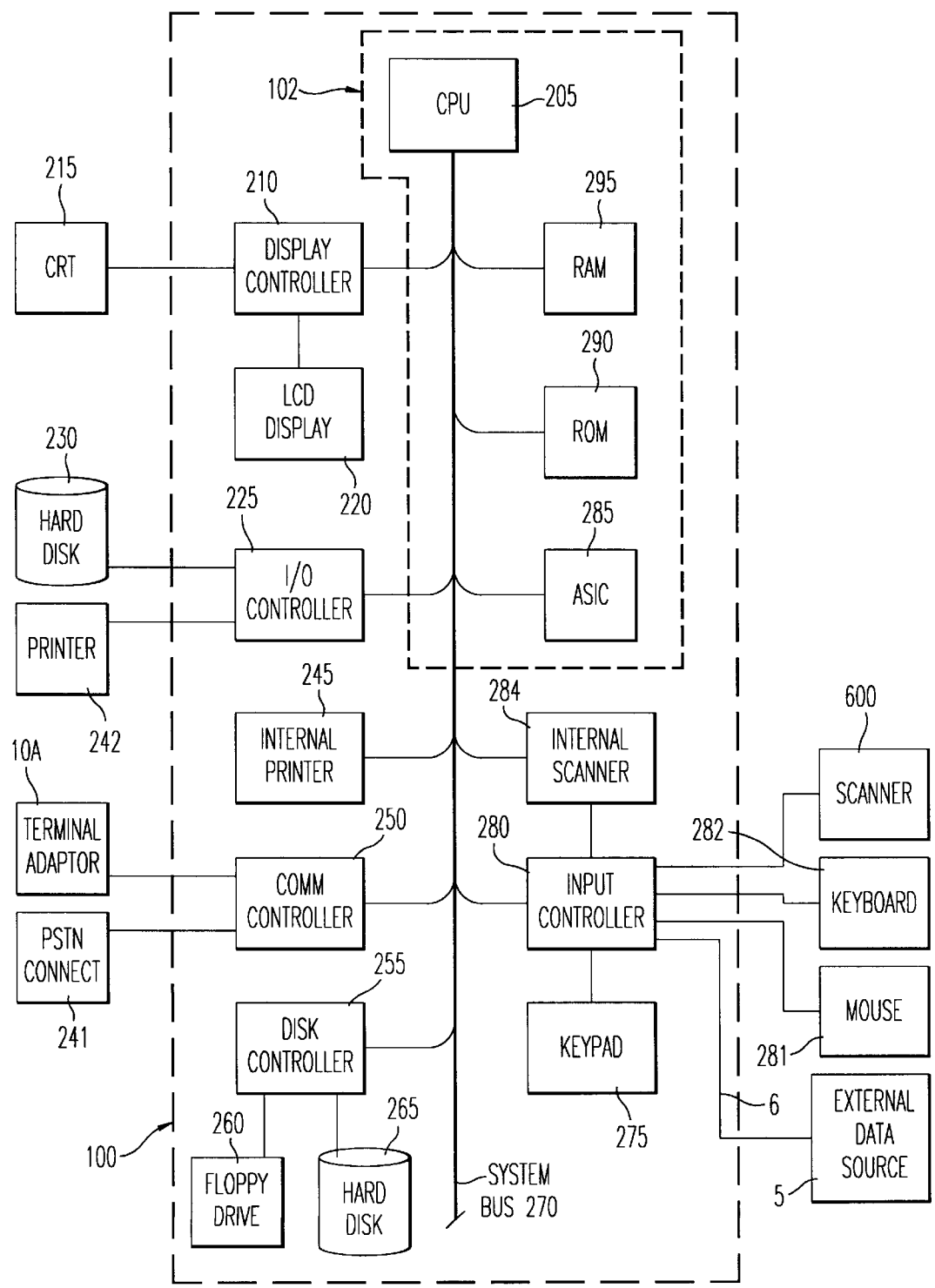
FIG. 7A is a block diagram of components included in the source or destination terminal.

FIG. 7A illustrates an exemplary source terminal 100, with preferred features therein, where the destination terminal 160 will include similar components. The source terminal 100 is connected to the terminal adapter 10A, which may be included internally or externally, and the terminal adapter 10A may also include brouter functions. The source terminal also connects to a PSTN connection 241, so that conventional communications may be sent over analog lines, if necessary. An external data source connection 5 is shown to connect to the source terminal 100 via an external interface 6, where the external data source 5 provides digital data or analog data (which is then digitized by the source terminal 100 with an analog to digital converter contained therein) to the source terminal 100 for inclusion in high data rate (e.g., 128 kbps) messages sent to the destination terminal 160. The external data source may be any type of data source that would benefit from transferring data to a remote location. Examples of external data sources 5 include a printer, digital camcorder, digital camera, digital versatile disk (DVD), digital video cassette recorder, CD player, digital telephone, computer and a photocopier.

The external interface 6 is a digital bus (e.g., serial or parallel) when the source terminal 100 receives digital data through a respective connector(s) formed therein. In particular, example external interfaces 6 include universal serial bus (USB), EIA-232, ISDN (ISO 8877), or IEEE 1394 ("Firewire") as described in Wickelgren, I., "The Facts About Firewire", IEEE Spectrum, April 1997, vol. 34, No. 4, pp 19–25, the contents of which are incorporated herein by reference. When receiving analog data, the external interface 6 is configured as a coaxial cable, a twisted pair, or an optical fiber (for example) as the source terminal 100 includes a respective connector for receiving the analog signals.

Because the source terminal 100 is configured to receive information from the external data source 5 via the external interface 6, the source terminal 10 provides a conventional facsimile function, albeit with a higher data rate capacity than conventional facsimile machine, and a significantly different function than conventional facsimile devices. In particular, the source terminal 10 of FIG. 7A also serves as a general purpose communications resource that is capable of transmitting data at a high data rate from various types of external data sources 5 to remote terminals. In a reciprocal manner, the source terminal 10 is equipped to receive data from another terminal (e.g., destination terminal 160) and provide the data to the external data source 5 for display thereon or for use therein.

The structure of the source terminal 100 as shown in FIG. 7A, also suitably describes the destination terminal 160, and general features of the processor 24 that would be employed in the ISDN switch 220, although appropriately adapted for an ISDN switch application as will be appreciated by one skilled in the ISDN art. A system bus 270 interconnects a variety of components that populate the system bus 270. A central processing unit (CPU) 205 executes software processes that provide general purpose control of the source terminal 100, SCC and data rate expansion mechanism operations as well as bus administration functions for the system bus 270. The CPU 205 has available to its system random access memory (RAM) 295 for temporary storage use of data, where the line buffer 610, buffer memory 612, and SAF memory 606 (FIG. 6) are included in the RAM 295 of the source terminal 100, which are downloaded upon system boot-up from ROM 290, or input alternatively by the user either during initial setup (with battery backup), or on an as per use basis. The non-volatile ROM 290 also holds the control program and fixed parameters. An application specific integrated circuit (ASIC) 295 is provided for performing specialized data manipulation functions, which could be adapted to serve as the entire data rate expansion mechanism 102, although in the present embodiment, most of the resource coordination mechanism is performed in the CPU 205 by the execution of a data rate expansion software-based process. As shown, the data rate expansion mechanism 102 is identified by the dash line in FIG. 5 and includes the CPU 205, RAM 295, ROM 290, and ASIC 285. However, because the data rate expansion mechanism 102 is largely computer-based, a subset of the components shown in FIG. 5 or additional components may be included as part of the data rate expansion mechanism 102.

As an alternative to the ASIC 285, other data manipulation devices such as field programmable gate arrays (FPGA, not shown), programmable logic devices (PLD, not shown) and other processing units (such as digital signal processing chips, not shown), may also be used. Also available as system resources are a disk controller 25, which controls an internal floppy disk 250 and a hard disk 265, and an input/output (I/O) controller 225, which controls an external hard disk 230 and an external printer 242. Either the external printer 242 or an internal printer 245 may be used to print text and data files output by the source terminal 100.

An input controller 280 is included that controls the internal scanner 600, an optional external scanner 283, an external keyboard 282, an external mouse 281, and an internal keypad 275. Under control of the input controller 280, either the internal scanner 284 or the external scanner 283 may be used to capture an image of an object document and convert the image into a digital data stream that is passed through the input controller 280 to the system bus 270 for further processing. The input controller 280 also receives input from the keypad 275, which serves as a data input device for the source terminal 100, although the keypad 282 and the mouse 281 serve as alternative input devices.

The input controller 280 also provides the interface (at a connector formed thereon) to the external interface 6 which interconnects the external data source 5 to the source terminal 100. For supporting digital signals, the input controller 280 includes interface logic that supports a FireWire interface or another interface standard such as USB, if another interface is used. When analog signals are provided, the input controller 280 includes an analog to digital converter (ADC) and digital to analog converter (DAC) for converting the external signals between the analog and digital domains. Data that is input to the external interface 6 is passed over the system bus 270 and stored in the RAM 295, where the data is later used by the CPU 205 and preparing the data rate expansion message.

A display controller 210 is used to control either, or both, of an external cathode ray tube (CRT) display 215 and an internal liquid crystal display (LCD) 220. Other displayed formats would also be suitable, including plasma displays, an active and passive light emitting diode (LED) displays, etc. The displays 215 and 220, in tandem with the keypad 275, the keyboard 282, and the mouse 281, serve a user interface function.

A communications controller 250 also resides on the system bus 270 and connects to the terminal adapter 10A. As discussed previously, the communication controller 250, and outputs information to the terminal adapter 10A according to RS232, V.35 or other data communication arrangement. The connection to the PSTN, is a RJ-11 connection, although other connections are possible such as a second ISDN connection, via another terminal adapter, etc., or a wireless access provider connection, for example.

Figure 7B:
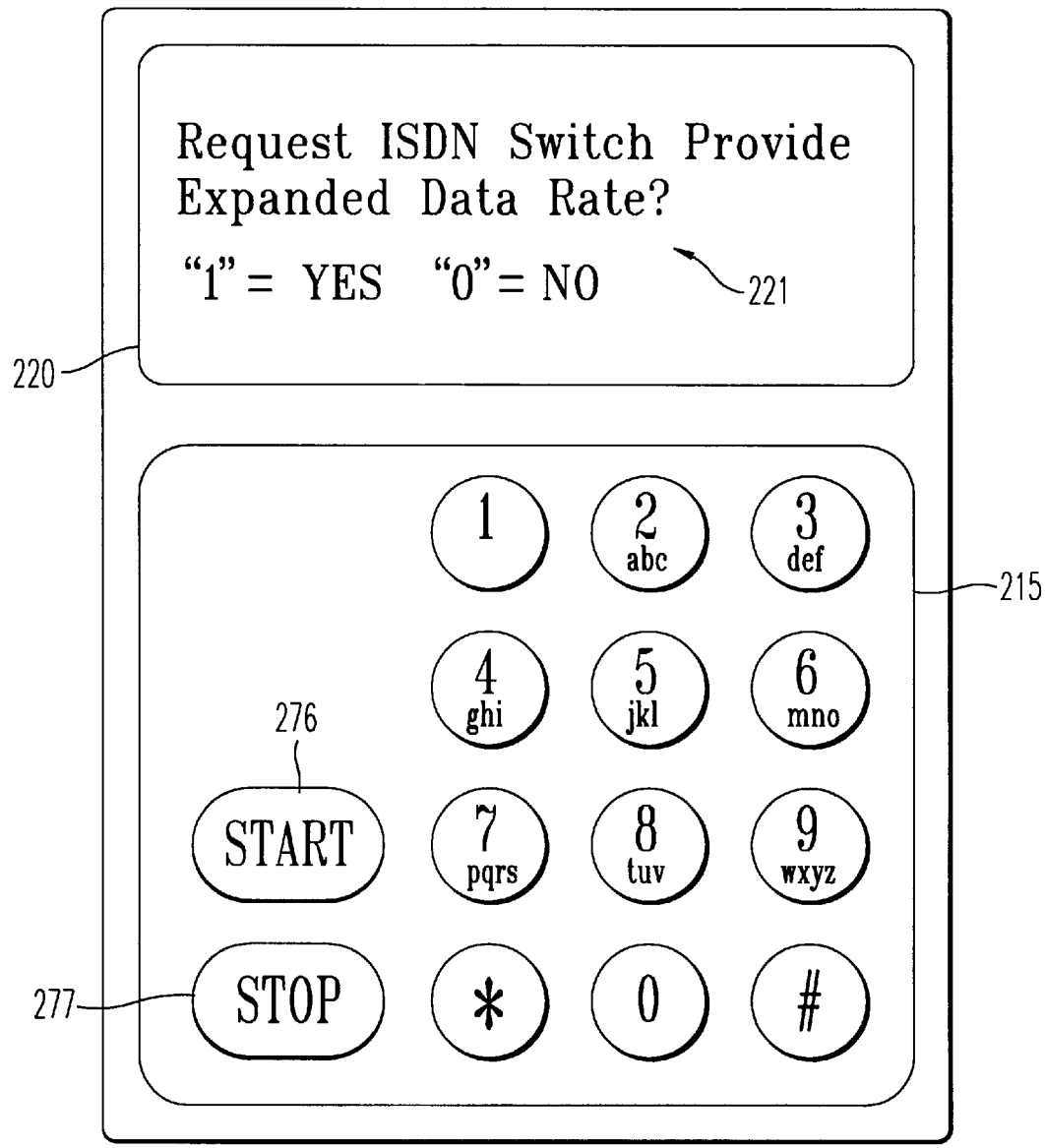
FIG. 7B is a plan view of a display and a keypad of the source terminal of FIG. 5.

FIG. 7B illustrates the display 220 and the keypad 275 of the source terminal 100. The keypad 275 includes a 12-digit numeric keypad, a "start" key 276 and a "stop" key 277. Data that is input by a user on the keyboard 275 is echoed (i.e., displayed) on the display 220 so that the user knows what the user entered at any given time. In addition, the display 220 also includes text, generated by the source terminal 100 which "prompts" the user to enter specific information at a specific time. For example in FIG. 7B, the display 220 is prompting the user to enter a "1" if the user wishes to request that the ISDN switch provide an expanded data rate connection for communicating with another device, or enter "0" if the user chooses not to make such a request.

Figure 1:
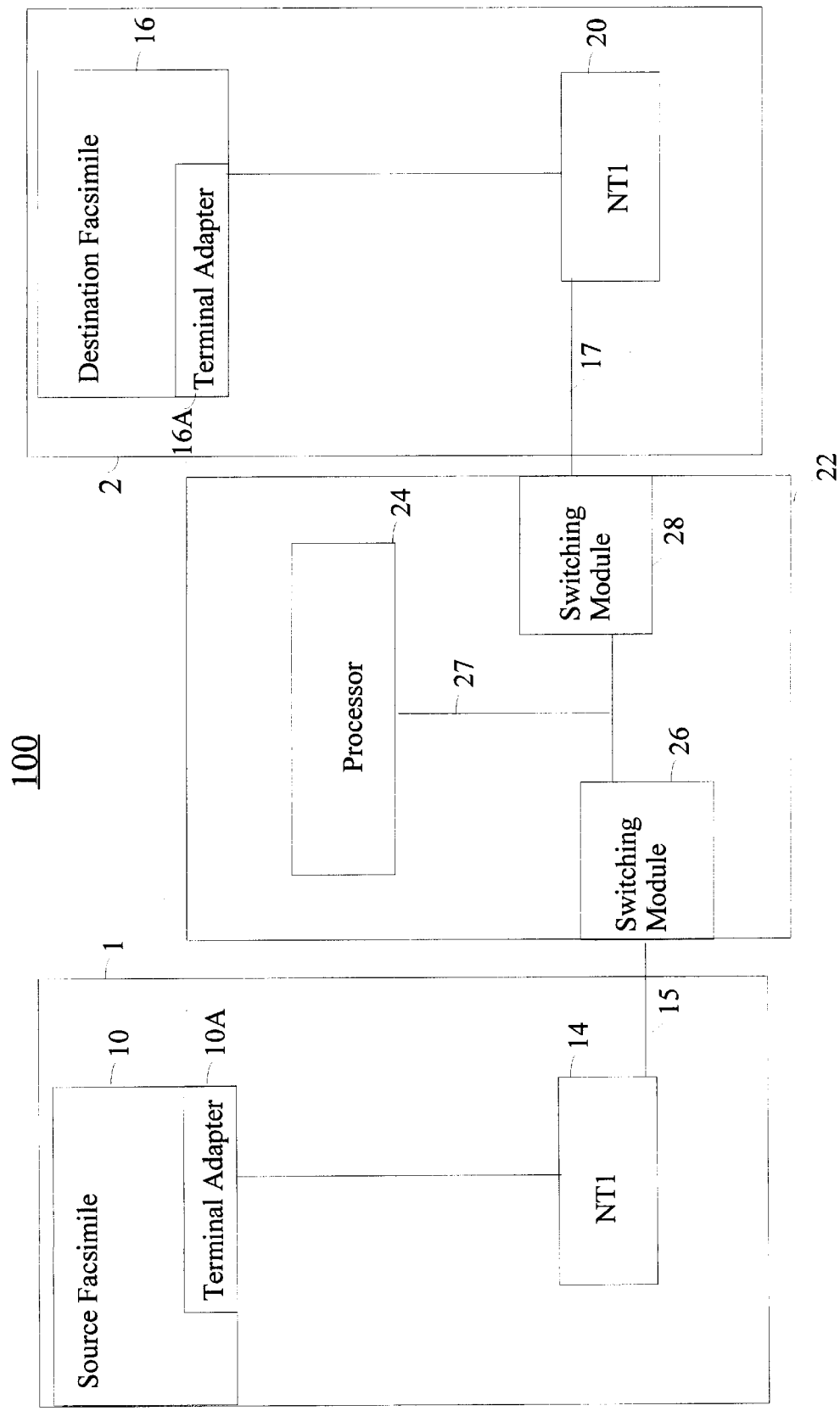
FIG. 1 is a block diagram of a conventional ISDN communication system.
Figure 3:
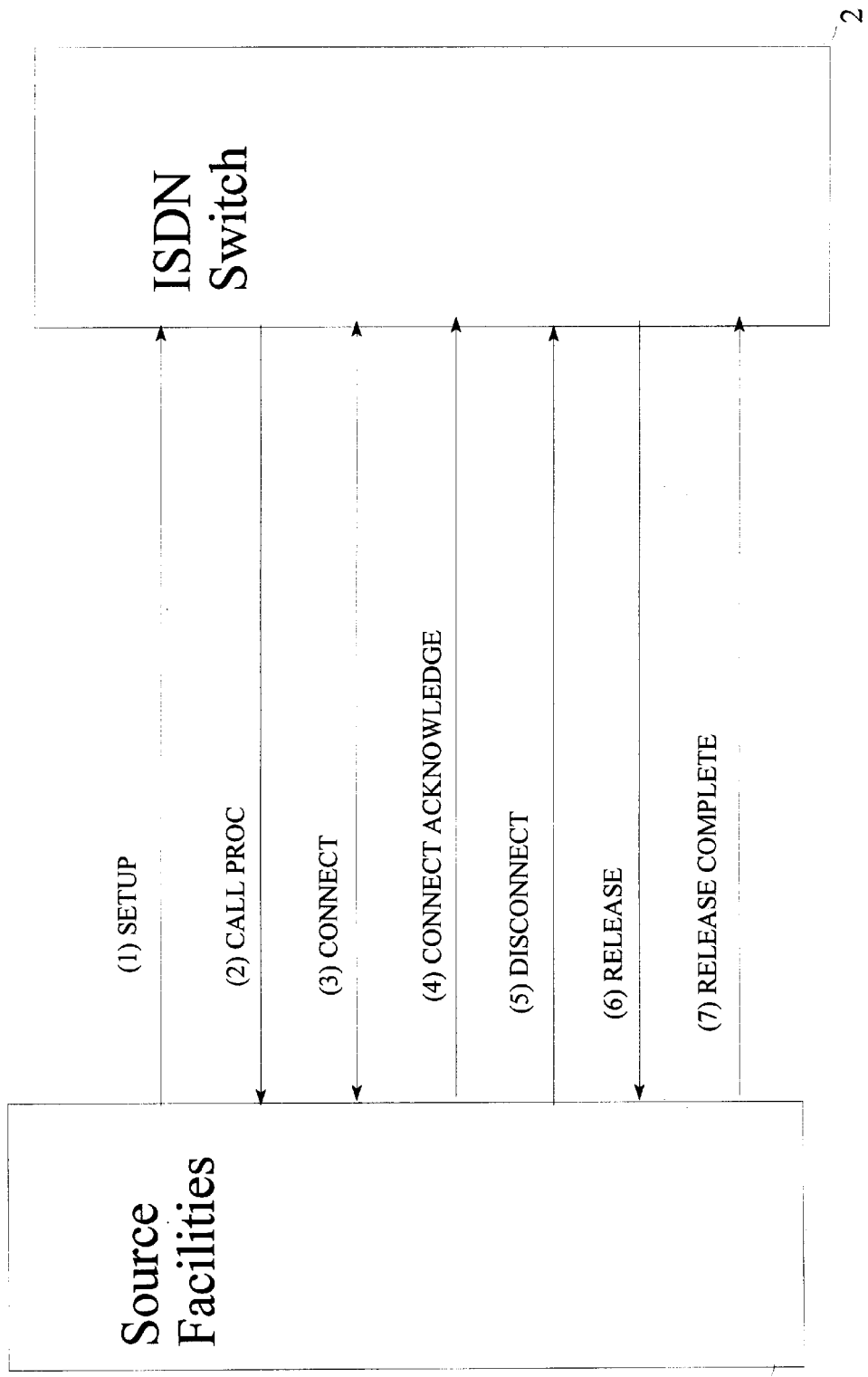
FIG. 3 is a conventional control signaling protocol for ISDN basic services.
Figure 4:
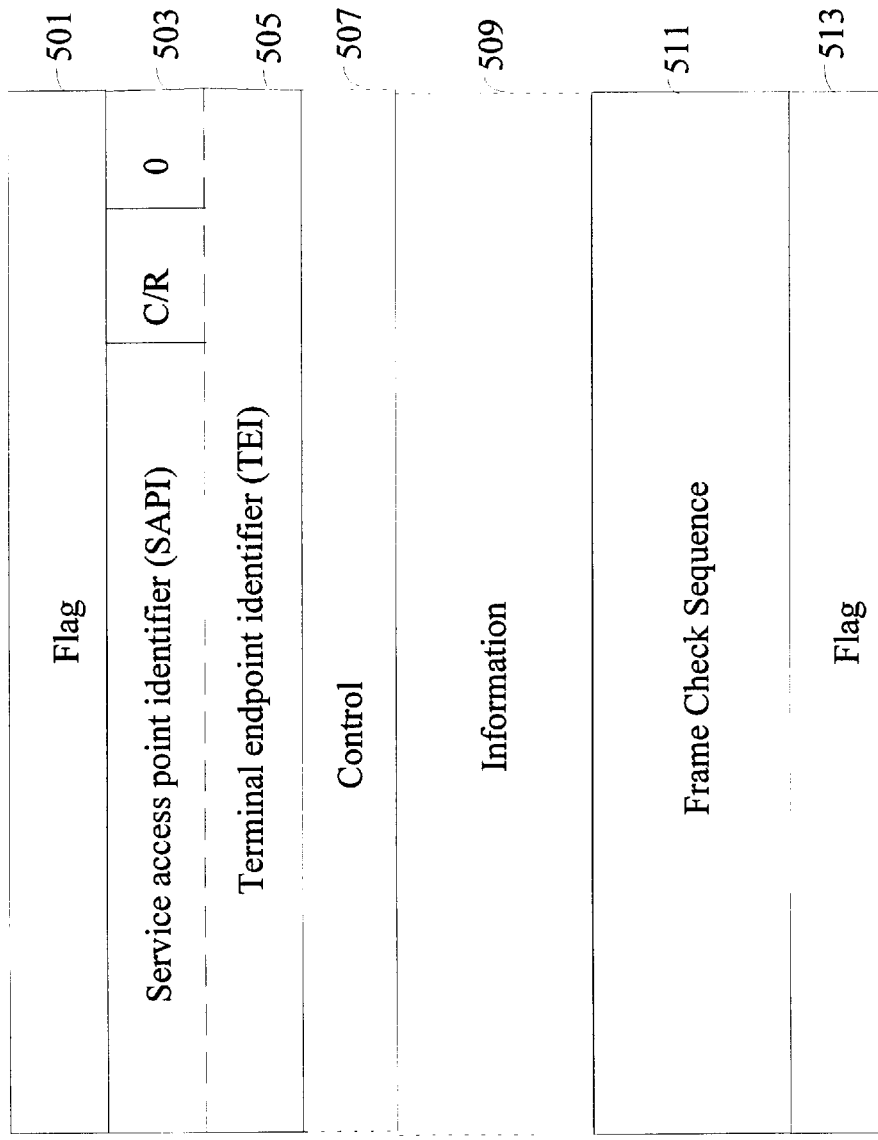
FIG. 4 is a conventional link access protocol, D channel message format for a setup message using an I.451/Q.931 message structure.
Figure 8:
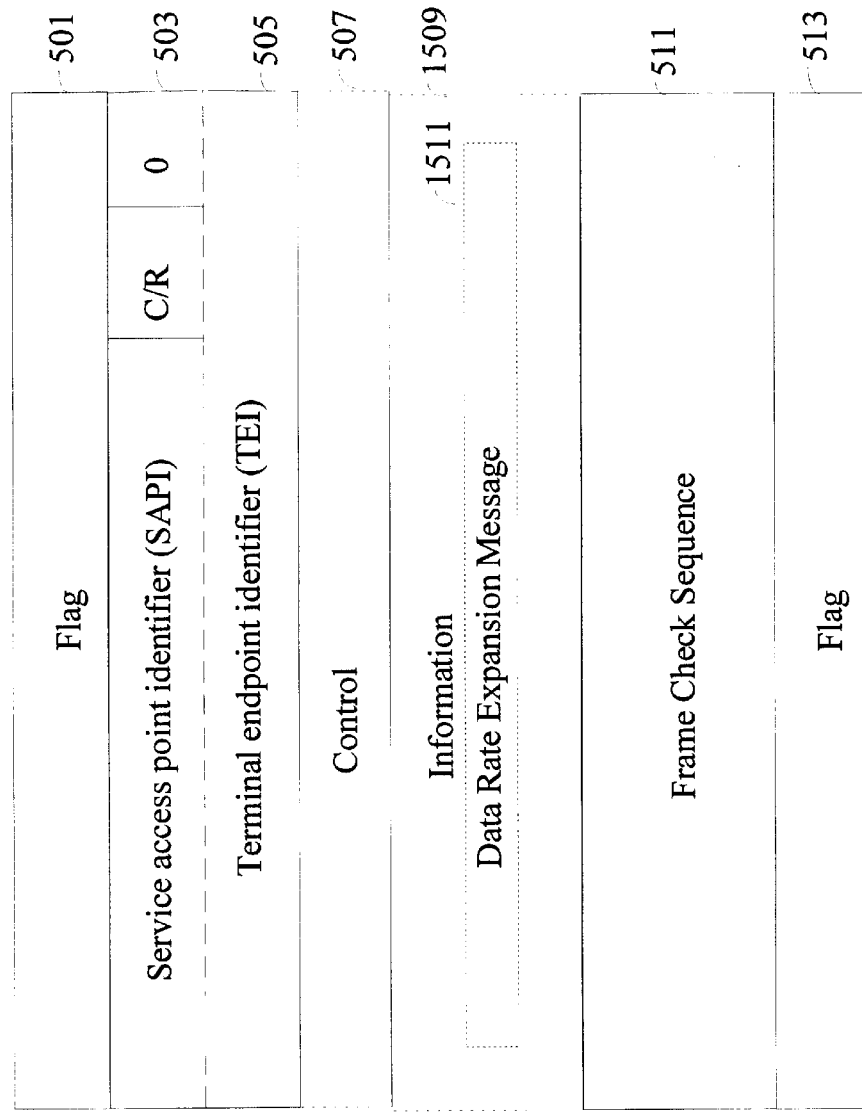
FIG. 8 is a modified Link Access Procedure on the D channel (LAPD) setup message structure incorporating a data rate expansion message according to the present invention.

FIG. 8 shows the LAPD frame structure for a setup message that is formed by the source terminal 100, stored in RAM 295, and subsequently sent via the system bus 270 to the terminal adapter 10A and then to the ISDN switch 220. A difference between the frame structure of that shown in FIG. 8 from that shown in FIG. 4, is that the information frame 1509 (of FIG. 8) includes a data rate expansion message 1511. This data rate expansion message 1511 includes an indicator field having a value indicative of the operator's response to the prompt shown in FIG. 7B. When the message is sent to the ISDN switch 220, the processor 24 in the ISDN switch 220 can then detect the presence of the value included in the indicator field and determine if the destination terminal 160 has available 2 B channels to support the expanded data rate. As previously discussed, the setup message including the LAPD frame shown in FIG. 8 is sent from the source terminal 100 to the ISDN switch 220 during a call setup, and the processor 24, will then establish a query message to be sent to the destination 160, querying the destination terminal 160 about the availability of 2 B channels. In this context, the processor 24 in the ISDN switch 220 provides simultaneous D channel connections between the source terminal 100 and destination terminal 160, prior to establishing and allocating B channel resources for the communication system. As alternatives, the decision process for identifying the presence of the 2 B channels may be moved to either the source terminal 100 or destination terminal 160 or distributed therebetween.

FIG. 9 shows exemplary frames employed in the data rate expansion message 1511 as was shown in FIG. 8. The reply message from the destination terminal 160 is similarly structured. A data rate expansion flag 580 is a first frame, included in one octet, or alternatively multiple octet blocks, as will be discussed. The data rate expansion flag identifies a specific code associated with establishing a high data rate channel between the source terminal and the destination terminal. Following the data rate expansion flag 580 is a "communication type" frame 582, which indicates whether the present communication is a multi-channel call setup message or not. Subsequently, a frame of total channels 584 is provided that indicates the number of high data rate channels (e.g. 2X B channels) requested by the source terminal. Subsequently, a station telephone numbers frame 586 is included that identifies the particular telephone numbers of the destination terminals to which the ISDN switch 220 is to communicate the high data rate information. The identifications are made by way of service profile identifiers (SPID), which are supported with national ISDN1 (NISDN1, the U.S. ISDN standard) systems. Inclusion of telephone numbers allows the receiving station to know which terminals are attempting to reach the receiving station. In the next frame 587, space is reserved for indicating the number of channels connected, communicated from the ISDN switch to the source terminal. Subsequently, an expansion frame 588 is included for future capabilities, as well as a stop flag field 590, indicating an end of the data rate expansion message 1511.

Figure 10:
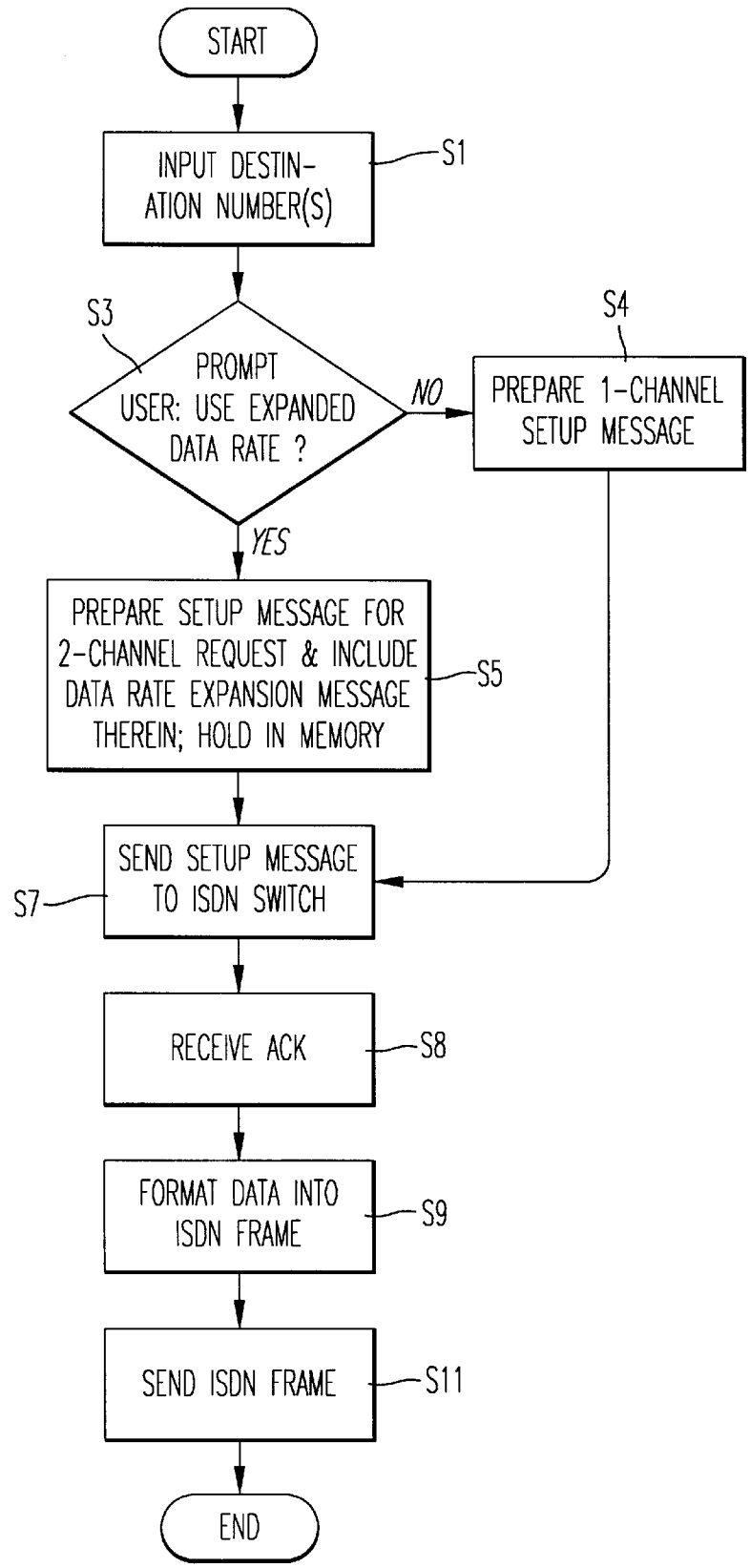
FIG. 10 is a flowchart of a method for initiating an expanded data rate communication session according to the present invention.

FIG. 10 is a flowchart of a process implemented at the source terminal 100 for preparing and sending a setup message requesting that the ISDN switch establish an expanded data rate channel for linking the source terminal 100 and the destination terminal 160. The process begins in step S1 where an operator inserts a document to be scanned in a scanner, and enters the destination number to which the scanned information is to be sent. Optionally, the scanned information may be sent to multiple locations, and thus the user will input multiple destination numbers. Step S1 concludes with the operator pressing the start button 267 (FIG. 7B) and then the process proceeds to step S3. In step S3, an inquiry is made in the form of a prompt displayed on the display 220 (FIG. 7B), requesting whether the operator wishes to use an expanded data rate when sending the information. If the response to the inquiry in step S3 is negative, the process proceeds to step S4, where the source terminal prepares a conventional setup message (requesting not more than one B channel) followed by the process proceeding to step S7. However, if the response to the inquiry in step S3 is affirmative, the process proceeds to step S5 where the source terminal 100 prepares a setup message, indicating that two B channels are requested and holds the data rate expansion message in memory. Subsequent to step S5, the process proceeds to step S7, where the source terminal sends the setup message to the ISDN switch. Moreover, if the response in S3 was affirmative, the setup message sent to the ISDN switch will indicate that the source terminal requests that both B channels be used for communicating with the destination terminal. On the other hand, if the response in step S3 was negative, a conventional message (is sent to the ISDN switch) thereby limiting communications to the destination terminal does not exceed 64 kbps.

After step S7, the process proceeds to step S8 where the source terminal 100 receives an acknowledgment from the ISDN switch that the requested service is provided. If however the ISDN switch indicates the service is not provided, the source terminal will assume a single B channel is available, unless informed otherwise by the ISDN switch. Subsequent to step S8 the process proceeds to step S9 where the source terminal formats the compressed video information into respective ISDN frames, and then in step S11 the respective ISDN frames are sent via the switch to the destination terminal. Subsequently the process ends.

Figure 11:
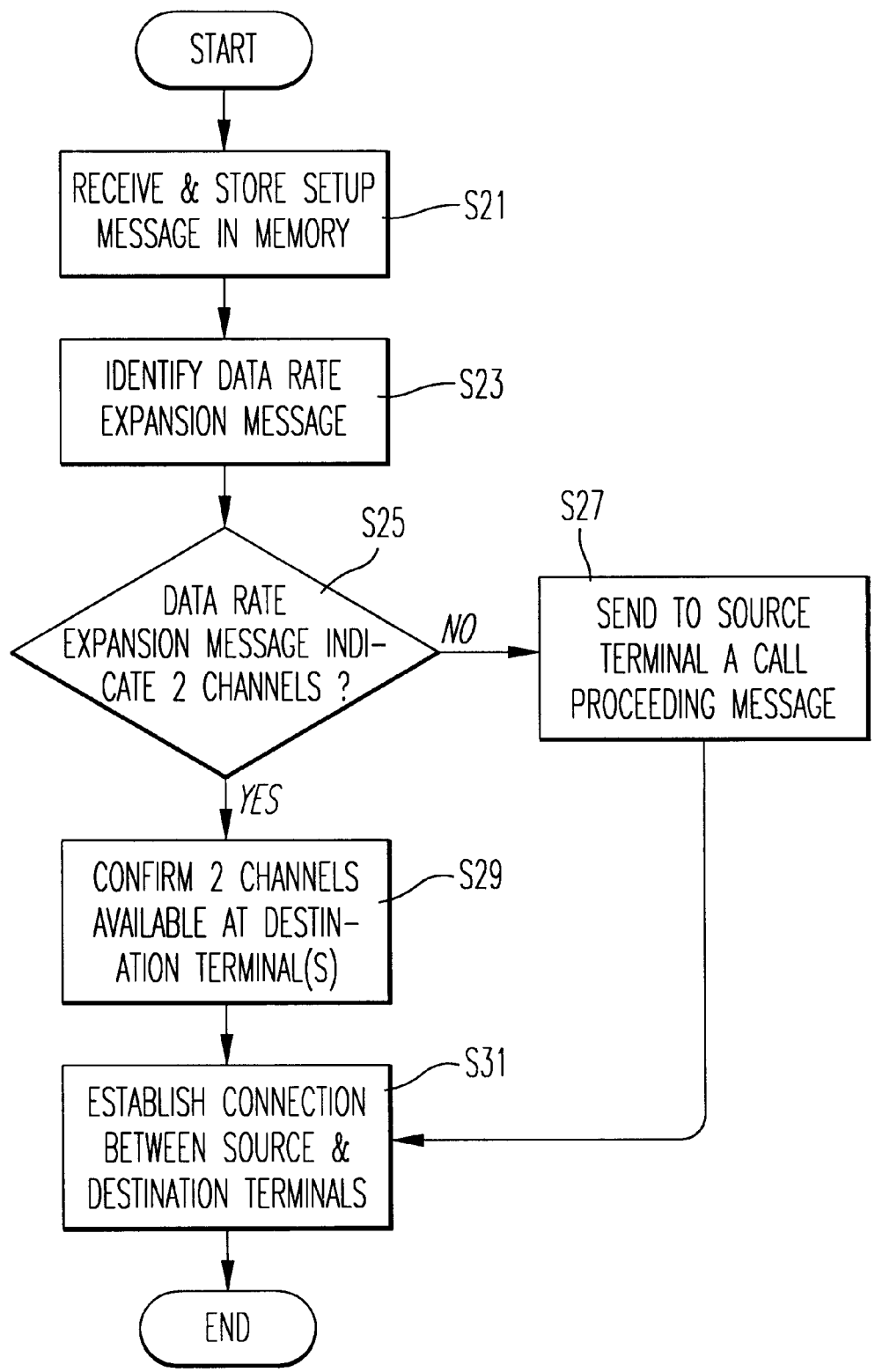
FIG. 11 is a flowchart of a process implemented in the modified ISDN switch for identifying and coordinating the expanded data rate communication between the source and destination terminals according to the present invention.

FIG. 11 is a process implemented at the ISDN switch for establishing an expanded data rate channel between the source terminal and the destination terminal. The process begins in step S21, where the ISDN switch receives and stores the setup message in memory. The process then proceeds to step S23 where the data rate expansion message is identified and analyzed. The process then proceeds to step S25 where an inquiry is made regarding whether the data rate expansion message indicates that two B channels are requested. If the response to the inquiry in step S25 is negative, the process proceeds to step S27 where the ISDN switch sends to the source terminal a call proceeding message and subsequently the process proceeds to step S31. However, if the response to the inquiry in step S25 is affirmative, the process proceeds to step S29. In step S29, the ISDN switch confirms that two B channels are in fact available for the destination terminal, or terminals if the source terminal requests the message be sent to more than one destination terminal. After confirming the two B channels are available, the process proceeds to step S31, and the ISDN switch establishes the connection between the source and destination terminals in step S31. After the communication between the source and destination terminals is concluded, the process ends.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An apparatus in an integrated services digital network computer-based system, comprising:
   a source terminal, having,
      a source processor,
      a source memory accessible to the source processor, said source memory configured to hold a source terminal program that when executed by the source processor forms an ISDN setup message having a data rate expansion message contained therein, said source memory being configured to hold a data rate expansion indicator for inclusion in said data rate expansion message, and
   a source terminal interface configured to be coupled to an ISDN switch, said ISDN switch having a channel coordination mechanism that assigns a first B channel and a second B channel as a composite B channel having said first B channel and said second B channel as components, and adapted to send said data rate expansion message to said ISDN switch, wherein
   said data rate expansion message provides said ISDN switch with said data rate expansion indicator so as to inform said ISDN switch that the source terminal requests a composite B channel for communication with a destination terminal using a single ISDN setup message, where said ISDN switch switches said first B channel and said second B channel as a single, inseparable channel that imparts a constant, fixed transmission delay between the information sent over the first B channel and the second B channel components of the composite B channel by sending the information over a same communications route to the destination terminal.

2. The apparatus of claim 1, further comprising:
   the ISDN switch comprising,
      a first switch interface coupled to said source terminal interface and adapted to receive said setup message with said data rate expansion message from said source terminal,
      a second switch interface coupled to said destination terminal,
      a switch processor, and
      a switch memory accessible to said switch processor, said switch memory configured to hold a central resource coordination program that when executed by said switch processor identifies the data rate expansion indicator in the data rate expansion message, and forms an inquiry signal that is sent to said destination terminal via said second switch interface, said processor when executing said central resource coordination program being configured to identify whether said destination terminal has at least two B channels available for communicating at an expanded data rate in said composite B channel.

3. The apparatus of claim 2, wherein said ISDN switch further comprises:
   the channel coordination mechanism.

4. The apparatus of claim 3, further comprising:
   said destination terminal comprising,
      a destination terminal processor,
      a destination terminal memory accessible to said destination terminal processor and configured to hold an availability indicator value indicative of whether the destination terminal has available at least two B channels, and
      a destination terminal interface coupled to said second switch interface and configured to receive said inquiry message therefrom, wherein
      said processor comprises a response mechanism configured to send the reply message to said switch in response to said inquiry message, said reply message containing said availability indicator value.

5. The apparatus of claim 1, wherein said source terminal interface is configured to send said data rate expansion message to said ISDN switch over an ISDN D channel.

6. The apparatus of claim 1, wherein said source terminal, said central coordination mechanism and said destination terminal are respectively configured to adaptively change from said composite B channel to at least one of said first B channel and said second B channel in response to an allocation change request message produced by at least one of said source terminal and said destination terminal.

7. An apparatus in an integrated services digital network computer-based system, comprising:
   an ISDN switch comprising,
      a first switch interface coupled to said source terminal and configured to receive an ISDN setup message containing a data rate expansion message from said source terminal, said data rate expansion message including a data rate expansion indicator,
      a second switch interface coupled to a destination terminal,
      a switch processor,
      a switch memory accessible to said switch processor, said switch memory configured to hold a central resource coordination program that when executed by said switch processor identifies a presence of a data rate expansion indicator in the data rate expansion message from a single ISDN setup message, and if present, determines if said destination terminal has at least a first B channel and a second B channel available, said processor when executing said central resource coordination program being configured to handle the first B channel and the second B channel as a single, composite B channel that imparts a constant, fixed transmission delay between the information sent over the composite B channel by sending the information over a same communications route to the destination terminal.

8. The apparatus of claim 7, wherein said first switch interface is configured to receive said data rate expansion message over an ISDN D channel.

9. A device in an integrated services digital network computer-based system, comprising:
   a source terminal, having,
      a source processor,
      means for holding a source terminal program for execution by the source processor and for holding a data rate expansion indicator for inclusion in a data rate expansion message, means for forming an ISDN setup message with a data rate expansion message contained therein and for including said data rate expansion indicator in said data rate expansion message, and source terminal interface means for sending said setup message with said coordination communication message to an ISDN switch, wherein said data rate expansion message from a single ISDN setup message informs said ISDN switch of a request by the source terminal to establish a first B channel and a second B channel as a composite B channel having said first B channel and said second B channel as components of the composite B channel for communicating at an expanded data rate with a destination terminal over a same communication route.

10. The apparatus of claim 9, wherein said means for forming an ISDN setup message comprises means for forming said coordination communication message to include a frame having a data structure that includes a control field indicative of the data rate expansion indicator.

11. The apparatus of claim 9, further comprising:

a ISDN switch comprising, first switch interface means coupled to said source terminal interface means for receiving said setup message with said data rate expansion message from said source terminal, second switch interface means coupled to said destination terminal, a switch processor, switch memory means accessible to said switch processor, said switch memory means for holding a central resource coordination program that when executed by said switch processor forms an inquiry signal that is sent to said destination terminal via said second switch interface, said switch processor comprising means for executing said central resource coordination program and identifying whether said destination terminal can accommodate the composite B channel for expanded data rate communications with the source terminal.

12. The apparatus of claim 11, wherein said ISDN switch further comprises:

means for means for changing between the composite B channel and one of the first B channel and the second B channel in response to a request by one of said source terminal and said destination terminal.

13. A device in a modified integrated services digital network computerbased system, comprising:

a ISDN switch comprising, first switch interface means for receiving an single ISDN setup message for establishing a composite B channel containing a data rate expansion message from said source terminal, said data rate expansion message including a data rate expansion indicator, a second switch interface means for communicating with said destination terminal, a switch processor, means for holding a central resource coordination program that when executed by said switch processor identifies a presence of the data rate expansion indicator in the data rate expansion message, means for forming and sending an inquiry signal to said destination terminal via said second switch interface means, and means for receiving a reply message from said destination terminal to determine whether said destination terminal has sufficient number of B channels available to support the composite B channel for communicating with the source terminal where all B channels that comprise the composite B channel send information over a same communications route.

14. A method for expanding a data rate in an integrated services digital network computerbased system, comprising:

holding a source terminal program in memory for execution by a source processor and holding a data rate expansion indicator for inclusion in a data rate expansion message;

forming a single ISDN setup message for requesting a composite B channel including a data rate expansion message further including said data rate expansion indicator;

sending said setup message with said coordination communication message to an ISDN switch;

informing said ISDN switch of a request by the source terminal to establish a first B channel and a second B channel as a composite B channel having said first B channel and said second B channel as components of the composite B channel for communicating at an expanded data rate to a destination terminal where all B channels that comprise the composite B channel send information over a same communications route.

15. The method of claim 14, wherein said forming step comprises forming said coordination communication message to include a frame having a data structure that includes a control field indicative of the data rate expansion indicator.

16. The method of claim 14, further comprising the steps of:

receiving at the ISDN switch said setup message with said data rate expansion message from said source terminal;

holding in said ISDN switch a central resource coordination program that when executed by said switch processor performs steps of, forming an inquiry signal, sending the inquiry signal to said destination terminal via said second switch interface, and identifying whether said destination terminal can accommodate the composite B channel for expanded data rate communications with the source terminal.

17. The method of claim 16, further comprising the step of:

changing at the ISDN switch between the composite B channel and one of the first B channel and the second B channel in response to a request by one of said source terminal and said destination terminal.

18. A method of expanding a data rate in an integrated services digital network computer-based system, comprising the steps of:

receiving a single ISDN setup message for requesting a composite B channel at an ISDN switch, said ISDN setup message containing a data rate expansion message from a source terminal;

holding a central resource coordination program that when executed by said ISDN switch identifies a presence of the data rate expansion indicator in the data rate expansion message;

forming and sending an inquiry signal to a destination terminal when said data rate expansion indicator is present; and receiving a reply message from said destination terminal to determine whether said destination terminal has sufficient number of B channels available to support the composite B channel for communicating with the source terminal where all B channels that comprise the composite B channel send information over a same communications route.

* * * * *

UNITED STATES PATENT AND TRADEMARK OFFICE
CERTIFICATE OF CORRECTION

PATENT NO. : 6,081,841

DATED : June 27, 2000

INVENTOR(S): Naeem Iqbal MALIK

It is certified that an error appears in the above-identified patent and that said Letters Patent is hereby corrected as shown below:

On the title page, item [54] and at the top of Column 1, the title is erroneously listed. It should be:

--[54] EXPANDED DATA RATE ISDN METHOD AND APPARATUS WHERE A SINGLE SETUP MESSAGE ROUTES MULTIPLE B CHANNELS OVER THE SAME COMMUNICATIONS ROUTE--

Signed and Sealed this

Twenty-ninth Day of May, 2001

*Attest:*

NICHOLAS P. GODICI

*Attesting Officer*  *Acting Director of the United States Patent and Trademark Office*